(12) United States Patent
Nohren et al.

(10) Patent No.: US 6,599,427 B2
(45) Date of Patent: Jul. 29, 2003

(54) STATIC FILTER PITCHER

(75) Inventors: John E. Nohren, Clearwater, FL (US); Brad Mierau, Clearwater, FL (US); Gerald Larsen, Clearwater, FL (US)

(73) Assignee: Innova Pure Water Inc., Clearwater, FL (US)

( * ) Notice: Subject to any disclaimer, the term of this patent is extended or adjusted under 35 U.S.C. 154(b) by 0 days.

(21) Appl. No.: 09/925,524

(22) Filed: Aug. 10, 2001

(65) Prior Publication Data

US 2002/0020673 A1 Feb. 21, 2002

Related U.S. Application Data

(62) Division of application No. 09/506,575, filed on Feb. 18, 2000.
(60) Provisional application No. 60/120,873, filed on Feb. 19, 1999, and provisional application No. 60/175,965, filed on Jan. 13, 2000.

(51) Int. Cl.[7] .................................................. C02F 1/28
(52) U.S. Cl. ...................... 210/660; 210/679; 210/688
(58) Field of Search ................................ 210/660, 679, 210/688, 282

(56) References Cited

U.S. PATENT DOCUMENTS

| | | | |
|---|---|---|---|
| 3,019,127 A | 1/1962 | Czerwonka et al. | 428/338 |
| 4,540,489 A * | 9/1985 | Barnard | 210/287 |
| 4,776,956 A * | 10/1988 | Gannaway | 210/282 |
| 4,793,837 A | 12/1988 | Pontius | 502/62 |
| 4,963,431 A | 10/1990 | Goldstein et al. | 442/149 |
| 5,076,922 A * | 12/1991 | DeAre | 210/282 |
| 5,161,686 A | 11/1992 | Weber et al. | 206/440 |
| 5,674,391 A | 10/1997 | Nohren, Jr. | 210/266 |
| 6,136,189 A * | 10/2000 | Smith et al. | 210/282 |

FOREIGN PATENT DOCUMENTS

EP  0 402 661  12/1990

* cited by examiner

*Primary Examiner*—Ivars Cintins
(74) *Attorney, Agent, or Firm*—Nixon & Vanderhye P.C.

(57) ABSTRACT

A pitcher or carafe housing is provided that has a raw water reservoir. A high performance filter receives raw water from a lower portion of the reservoir. The water is preferably received at or travels through a water entry tube to the back and bottom of the filter. In about 1–3 minutes the water percolates through the filter element, until it reaches a water exit port. A pouring chamber may be provided at the side of the pitcher for receiving the water from the water exit port, so that the water will continue to be treated and flow up into the pouring chamber until the water level equalizes in height in the reservoir and the pouring chamber. The filter and its housing may be placed into and removed from the inside of the raw water reservoir, or the filer housing may be side loaded. The filter media may be a polyester non-woven mat with a weight of 4–7 oz./yd.$^2$ impregnated with carbon or zeolite and subject to compression between about 25–75% (e.g. about 50%).

7 Claims, 5 Drawing Sheets

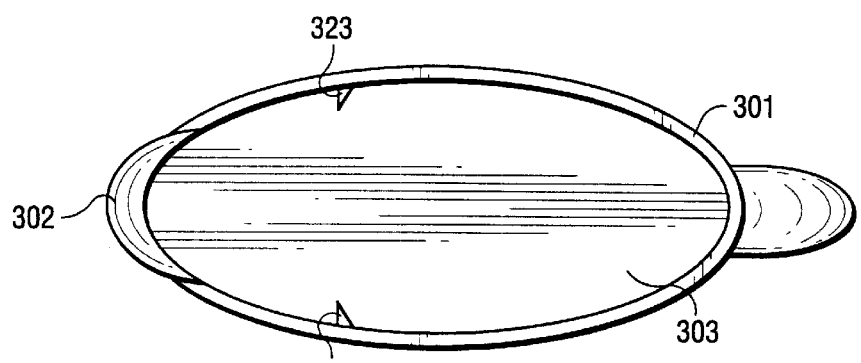
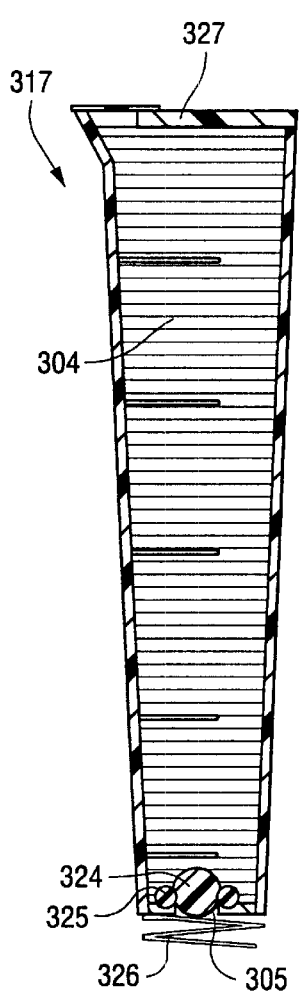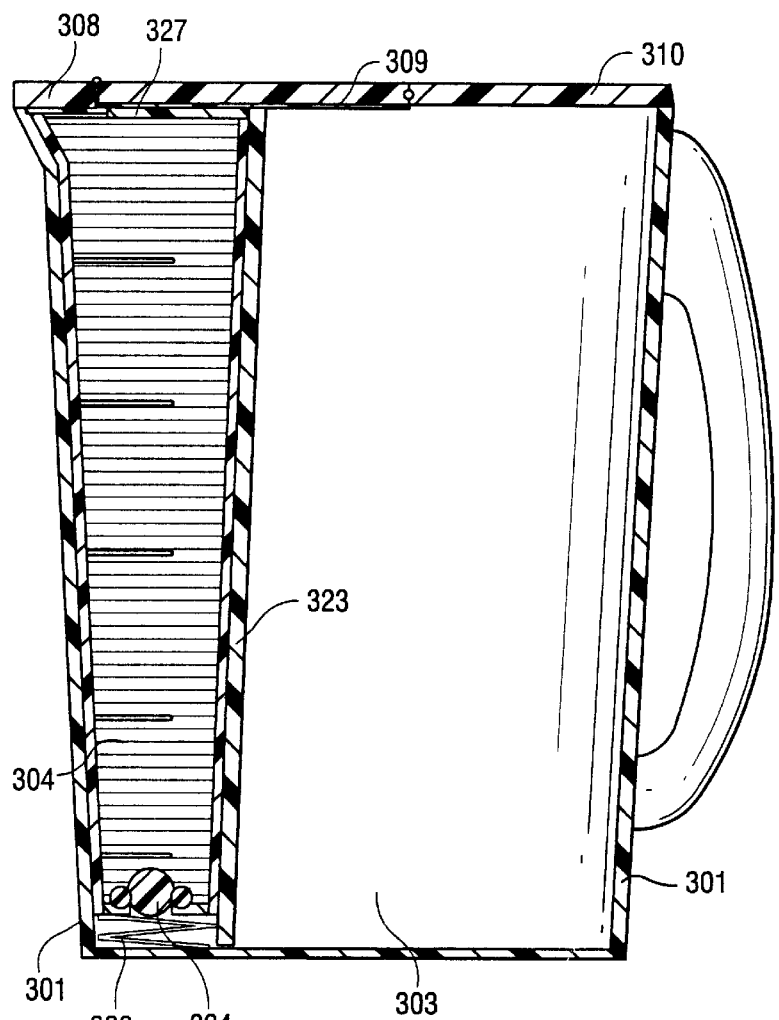
Fig. 7
Fig. 6
Fig. 5

STATIC FILTER PITCHER

CROSS REFERENCE TO RELATED APPLICATIONS

This application is a division of application Ser. No. 09/506,575, filed Feb. 18, 2000, pending, which claims the benefit of Provisional Application No. 60/120,873, filed Feb. 19, 1999, and Provisional Application No. 60/175,965, filed Jan. 13, 2000, the entire content of each of which is hereby incorporated by reference in this application.

BACKGROUND AND SUMMARY OF THE INVENTION

As the quality of municipally supplied water has declined the consumer has maintained a desire for "good tasting" water. The public has also become aware of the negative health effects associated with chlorination, used to disinfect tap water. Consumers seeking an alternative to tap water for better quality and taste have driven commercial "Bottled Water" sales to more than three billion dollars a year. A variety of filtration products have been introduced to compete with Bottled Water in providing these benefits, plus convenience and economy. The most popular of the filtration products has been the variety known as pour through carafes, or pitchers. While popular, the products presently marketed possess several drawbacks, that have kept the filters (treatment elements are all covered by the descriptor "filter(s)") from achieving greater favor. Major inadequacies have included the time element required to operate a pour through carafe. These devices must be cycled through filling a water chamber, generally comprising about half the volume of the overall container, and waiting until the water has trickled through the filtering element into a second, lower compartment occupying the second half of the container. The time required for filtration is typically 15–30 minutes for two to three liters of water. In addition, as only one-half of the container volume is usable, the containers are typically larger than fit conveniently within the refrigerator. Further, the quantity of treated water available is frequently less than needed, yet the time required to replenish (filter) the water is too long for the filter to be of practical value (i.e. fill a coffee pot etc.) if water had previously been withdrawn and not immediately refilled.

The drawbacks of filtration pitchers and carafes have been overcome by the invention herein disclosed, without diminishing the performance or economy. In addition, greater utility and convenience is achieved by the subject invention.

The product and technology disclosed comprises or consists of a novel new media and a water treatment product specifically designed to utilize and take advantages of the characteristics inherent with the media further described in this disclosure. The product described achieves high levels of water treatment efficiently, fills rapidly, and permits the total volume of the container to be filled and utilized. Clean, fresh tasting water may be delivered within sixty seconds of filling. Typically within five minutes after filling, water is delivered with =90% of lead, chlorine, and certain other contaminants removed. This is accomplished with the development of a new treatment concept combining static treatment with a water feed reservoir. To operate at optimum efficiency it is desirable to use a configuration design that basically controls the length of time the water is in contact with the treatment media. While there are several ways to accomplish this the configurations disclosed use a water in-feed orifice, or tube, which under the available head pressure allows the amount of water entering the treatment unit, or filter, to equal the void volume contained therein. By directing the in-feed water to the point furthest from the out feed, or pouring port, maximum treatment is achieved within the residence time limit designed into the product.

To achieve static treatment, activated carbon, as well as other media, are affixed to randomly oriented fibers, or other highly porous and compressible substrates. Examples of static treatment media are disclosed in my prior European Patent Application Publication number 0 402 661, the disclosure of which is incorporated herein by this reference. In accordance with the invention, the resulting matrix is compressed to form a treatment zone whereby the contaminant molecules contained within the treatment zone are within 1.5 millimeters, or less of a carbon, or other media element. Such a configuration provides for the movement of contaminant molecules to an active site on the media within a practical amount of time, without requiring convective flow. Diffusivities of common water contaminants are on the order of $5 \times 10^{-6}$ cm$^2$/s, allowing treatment of the water within a time span of seconds to minutes, even without water flowing through the filter. Diffusion and equilibrium within a body of fluid are well known phenomena, which form the basics of the mechanism by which static treatment functions. Static treatment requires the body of water being filtered to be placed within the treatment media and left in contact for a specific period of time. The time element for contact is generally from 30 seconds to 10 minutes depending upon the contamination and removal percentage required. As an indicator of the validity of the concept, one may model the diffusion of a well-mixed solution poured into a static treatment device as a plane source of contaminant between two planes of adsorbent. If the diffusivity is assumed to remain constant, the amount of contaminant which has traveled the distance to the adsorbent planes can be readily calculated. While an actual estimation of the degree of removal with time depends on the concentration profiles employed, these calculations illustrate the general nature of solute migration within the low-density medium.

The equation for diffusion in one dimension when the diffusivity (D) is constant is written $$\frac{\partial C}{\partial t} = D \frac{\partial^2 C}{\partial x^2}$$

Differentiation of this diffusion equation results in a solution for the concentration profile $$C = \frac{A}{t^{\frac{1}{2}}} \exp(-x^2/4Dt)$$

where A is an arbitrary constant. This solution is symmetrical with respect to x=0 and approaches zero as x approaches positive or negative infinity for time>0. For a reference cylinder of infinite length and unit cross sectional area, the total amount of substance diffusing (M) is given by $$M \int_{-\infty}^{\infty} C \, dx$$

If we rewrite the equation for the concentration distribution given above so that $$x^2/4Dt = \xi^2, \quad dx = 2(Dt)^{0.5} d\xi$$

we see that the amount of substance diffusing remains constant and equal to the amount originally deposited on the plane at t=0 and x=0.

$$M = 2AD^{0.5} \int_{-\infty}^{\infty} \exp(-\xi^2)d\xi = 2A(\pi D)^{0.5}$$

Substituting for A in the equation for the concentration distribution yields $$C = \frac{M}{2(\pi Dt)^{0.5}} \exp(-x^2/4Dt)$$

or alternatively $$\frac{C}{M} = \frac{1}{2(\pi Dt)^{0.5}} \exp(-x^2/4Dt)$$

The following table describes the relationship between the percentage of starting material which has diffused to the adsorptive sites (C/M), the distance between adjacent adsorptive particles (assuming the plane of initial contamination was equidistant between them), and the time required for this diffusion to take place.

| Percentage Diffused | Distance between particles (Cm) | Time Required (seconds) |
| --- | --- | --- |
| 0.90 | 0.05 | 8.0 |
|  | 0.10 | 40.4 |
|  | 0.20 | 223.4 |
|  | 0.30 | 664.3 |
| 0.75 | 0.05 | 7.6 |
|  | 0.10 | 37.8 |
|  | 0.20 | 202.4 |
|  | 0.30 | 578.4 |
| 0.50 | 0.05 | 6.8 |
|  | 0.10 | 33.1 |
|  | 0.20 | 168.5 |
|  | 0.30 | 455.5 |

Generally speaking, with static treatment, no water flow takes place during the treatment process. In contrast dynamic filtration, which is used in all current consumer products, has the water flowing through the filtration media. This provides a shortened time in contact unless the water is trickled through slowly, thus requiring an inordinate period of time to deliver water in a non-pressurized system, or an impracticably large filter.

The rate of contaminant removal in porous materials is controlled by two principle mechanisms: mass transfer resistances and the kinetics of adsorption/desorption. In filtration using activated carbon (and most other adsorbents), the kinetics of adsorption/desorption are very rapid compared to the rate of mass transfer between the bulk fluid and the solid. Hence the overall rate of contaminant removal is determined primarily by the mass transfer resistances of the system. These resistances are normally characterized as resulting from external film mass transfer resistance and intraparticle diffusion within the pores of the solid. A discussion of the intricacies of intraparticle diffusion is not germane to the teachings of this invention, in that they apply to all methods of water filtration using porous adsorbents. External film resistance to mass transfer describes a laminar sublayer of solvent (water as described in this example) through which mass transfer only takes place by molecular diffusion. The inner surface of the boundary layer is occluded by the surface of the adsorbent particles, allowing access to the inner adsorptive sites at only the pore openings. In traditional filtration the thickness of this layer is very small, and controlled by the velocity of fluid flowing past the adsorbent surface. In flow systems the principle mass transfer resistance is generally intraparticle diffusion, since the boundary layer is small as is the area accessible to molecular diffusion.

In contrast, for a static system, the boundary layer is very pronounced. At its limiting case, the boundary layer extends all the way between adjacent adsorbent particles. As the effects of bulk molecular diffusion on mass transfer are enhanced by the thickness of the boundary layer, the role of this resistance (rather than on intraparticle diffusion) on controlling the overall rate of contaminant removal becomes more predominant. Thus in a static treatment system, the control of operational performance shifts from the physical nature of the adsorbent to the manner in which the adsorbent is deployed.

There are several important implications to transferring control in this manner. The distance between adsorbent particles may now be expanded up to a point, where the rate of contaminant removal is optimized with regard to the size of the treatment device and its capacity to contain a fluid to be treated. The restriction of maintaining an adsorbent bed density at a certain level to promote effective hydrodynamic operation is no longer a concern. The device is no longer designed to provide flow under conditions where the depth of the boundary layer is minimized, eliminating criteria which make it difficult to design a small device which performs at a high level as defined by consumer demands. Summarizing the mechanism of static treatment, contaminant molecules contained within an extended boundary layer of solvent surrounding the treatment media, are adsorbed and removed from primarily the water contained within the pores of the adsorbent particles. As molecular contaminants are removed from the local environment of the adsorbent-pores, other molecules enter this environment through diffusion at a rate that is dependent upon their diffusivity and concentration. Thus, the process is a continuing one where contaminants are continuously being stripped from the localized water within the micropores of the treatment media and replaced by a constantly reduced contaminant level, until the contaminant level in the bulk fluid approaches the local equilibrium concentration within the micropores. Should the carafe or water container be left with the water undisturbed, thermodynamic forces will allow contaminant molecules to reach and bind to the adsorbent. If disturbed convection currents will enhance the action.

The extraparticle/extrafiber porosity of the treatment matrix may be closely controlled to optimize the functions of (1) Filling or replenishing, (2) Time in contact required to achieve contaminant results and, (3) Rate of pouring, or flow of treated water from the treatment media. Functions (1) and (3) are most easily achieved with a more open, less restrictive filter density. Function (2), contact time required is reduced as the density is increased.

The BET surface area (Journal of the American Chemical Society, vol. 60, p309, 1938) of a particular adsorbent is often used to reflect the number of binding sites available for contaminant removal per unit mass, and the ratio of pore volume to this surface area as an indicator of adsorption preferences based on molecular size of the contaminant. The porosity (pore volume per unit mass) of an adsorbent has also been used to provide an indication of adsorptive capacity. However, fluid contained within the pore structure of the adsorbent media is not generally accessible for removal from the filter, as capillary forces tend to hold it in place. Thus the overall porosity of the medium is not a useful descriptor of the treatment capacity of an adsorbent bed used in static treatment.

The only fluid (in particular water) which is available for use from any filtration device is that which is contained in the extra-particular or 'bulk' volume surrounding the adsorbent. In static treatment, this bulk volume must be sufficient to deliver a useful amount of fluid from the filter when drained, yet the distance between adsorbent particles must be small enough for the bulk fluid to approach equilibrium within a practical time.

A useful term to describe a filter medium, which can be operated in a static manner, is the ratio of "readily deliverable fluid volume" (RDV) to bed volume (BV). Readily deliverable fluid volume is defined here as the volume of fluid, which will drain from a decanted filter bed without the application of any external force (other than gravity). Static filters typically have an RDV from about 30 to 60 percent of the BV.

Traditional filtration devices cannot be operated effectively in a static manner, because the extra-particular bulk volume in a packed bed is very small relative to the bed volume. The RDV of a granular activated carbon bed packed with 12×40-mesh carbon is typically 5 percent of the BV when measured with a bed diameter/depth ratio greater than one. The utilizable volume is even smaller under conditions of actual use. The argument cannot be made that a packed bed overlaid with a column of fluid constitutes static treatment, as the mean distance between a fluid molecule and an adsorptive site is too large to allow for treatment within a reasonable amount of time. In addition, in such a system the tortuocity of the fluid path between the particles of the packed bed would hinder diffusion to the point of making the majority of the bed inaccessible to adsorption.

Density is achieved by compressing an open matrix to reduce the average distance between adsorbent particles, or individual void which holds the water, to be approximately 65 nL (or $65 \times 10^{-8}$ liters) in volume. This equates to a RDV/BV ratio in the neighborhood of 0.4. Larger voids are tolerated if residence time between use is not a priority.

Total effective treatment area is a function of the mass of the adsorbent contained in the treatment matrix. The composition of the static treatment media must be optimized to provide for a matrix with sufficient structural stability so as not to migrate during use, as well as containing enough adsorbent to effect a useful capacity for chemical removal. A preferred embodiment of media is disclosed in Appendix A hereto. A matrix of sufficient rigidity to be compressible, yet not pack when wet is created by using a 480 oz./cubic yd. non-woven polyester substrate coated with a mixture of activated carbon (and/or ion-exchange, zeolite compounds or other treatment media) and binder at a level of 50–200% by weight. Other substrate densities which are known to be effective include non-woven polyesters with densities ranging from 480 to 720 oz./cubic yd., however much lower densities are applicable if steps are taken to support the media during hydrodynamic conditions. The substrate used is not restricted to polyesters, only to materials which are appropriate to the desired end-use. For filters designed for use in treating potable water, a substrate which is listed under Title 21 of the Code of Federal Regulations, Section 177.2260 (21 CFR §177.2260, the disclosure of which is hereby incorporated by reference herein and a copy of Appendix B hereto) is appropriate. Certain types of cellulose pulp, cotton, nylon, rayon and polyethylene terephthalate are described in 21 CFR §177.2260. For other applications, such as decontamination of a non-potable liquid waste stream, a substrate with different properties may be more appropriate. The adsorbent material used to coat the substrate is typically ground to a powder in order to facilitate the coating process and improve the kinetics of adsorption, but static treatment media can be produced using particles of essentially any size so long as the RDV/BV requirements are not violated. An alternative but less flexible media form is to produce a porous monolithic element comprising or consisting of one or more treatment medias typically bound together with a polymer. Such a treatment element differs from treatment elements typically known as "Carbon Block" filters as a result of the greater porosity required. The porosity allows the volume of water treated to be useful and function as a static filter as previously disclosed. Such porosity greatly limits the ability of the element to function in a dynamic treatment mode.

When a substrate is used to support the carbon or other treatment media, the media must be bound to the substrate. While there are a number of methods that may be employed, dipping, spraying, and vacuum deposition for example, an important element is the chemical-bonding agent used. Not only must the largest number of contact sites be left available for contaminant removal, but the bonding chemical must also be appropriate to the intended end-use conditions. For example, media which is intended for use in treating potable water should contain binders which are listed in 21 CFR §177.2260. Research has indicated that certain acrylics are one of a few bonding agents which meet all of the physical as well as toxicological requirements for this application. A wider variety of binders, including vinyl chloride polymers, may be appropriate to other applications.

To be attractive to the consumer, the filtration pitcher or carafe of the invention must fill rapidly, be able to filter a prescribed volume of water within 30 seconds for taste, and 2–10 minutes for optimal removal of the targeted contaminants, generally lead and chlorine. The filtration element should be easily replaceable and, to the degree possible unobtrusive. The filter must be sized and configured to treat water efficiently yet not to retain an excessive quantity of water. In a product design employing static filtration a filtration element positioned at the base of the pitcher, or container, best serves this criteria. A container filled with the media would retain too much water as a result of surface adhesion. To gain residence time in a static mode not only is the filter positioned at the base of the container, but the water path, or entry, into the filter element is through ports positioned at the back, or handle, end. Thus, when poured, the water within the filter is retained and precluded from going back into the reservoir during the pouring cycle, yet free to exit for pouring from the container. The rear entry of the water into the filter delivered to the base also provides the longest water path through the filter to the forward exit opining in the filter at the pouring end of the pitcher.

The second element in this product design is the unique carafe or pitcher, which facilitates embodiment of a static treatment filter. The pitcher comprises or consists of a compartmentalized container, which is essentially made up of a main body, which is separated into a raw water containing section and a pouring section. The containing section is integrated with the pouring section substantially only at the base of the pitcher, at the points of engagement with the treatment element. The treatment element occupies the base area of the pitcher and extends some 1.5 inches to 3 inches up from the base, but may be more or less. The treatment element has a water access opening to the rear of the pitcher and the second opening at the front end of the treatment or filter housing. Water from the filter element enters the pouring chamber of the pitcher through the chamber access hole. A seal is formed between the raw water containing component and the filter. Some designs may also require a seal with the pouring chamber. The treatment element is replaceable. The pitcher container has another unique feature, a closed top in the form of a horizontal baffle, or sealing top. An access port is built into the top for filling the container with water, or the entire top cover may be removed.

The advantage of placing the treatment element at the base of the pitcher is that standing in the up-right position water enters the filter and remains within the treatment element until poured out. The filter is sized to accommodate typically 2–3 eight ounces of water per pour. When the contents of the filter element have been poured out, the filter rapidly refills through the fill port positioned at the back, or handle, side of the pitcher. Fill of the treatment element is rapid from the water remaining within the raw water reservoir. The pitcher may be poured immediately, delivering good tasting water, or more highly treated water by waiting 2–5 minutes.

According to one aspect of the present invention a water filtration assembly is provided comprising the following components: A first housing defining a raw water reservoir and having upper and lower end portions. A raw water inlet opening defined in the upper end portion of the first housing to allow raw water to flow therethrough into the raw water reservoir. A closure structure operatively connected to the upper end portion for selectively closing the inlet opening of the first housing. A filter housing having a raw water inlet port in operative communication with the raw water reservoir for receiving raw water from the lower portion of the first housing, and an outlet port for filtered water. And a treatment media disposed in the filter housing for treating water flowing from the raw water reservoir into the filter housing through the inlet port.

Typically, the assembly further comprises a conduit for conducting raw water from the inlet port of the filter housing to a portion of the filter housing remote from the inlet port. In one embodiment of the invention the first housing comprises an inner, substantially liquid impermeable housing, the inner housing being disposed in an outer, substantially liquid impermeable housing having upper and lower end portions, a radial gap being defined between at least a portion of the inner and outer housings so as to define a pour chamber, the pour chamber being in sole communication with the outlet port of the filter housing for receiving filtered water therefrom. For example, the closure structure comprises a semi-fixed portion, a hinged portion for being moved between open and closed positions selectively providing access to the raw water inlet opening, and a pour A chamber cover hingedly coupled to the semi-fixed portion for movement between open and closed positions selectively permitting dispensing of filtered/treated water from the pour chamber. The filter housing may be disposed in said lower end portion of said inner housing and an outlet port is defined in a side wall of said inner housing for being aligned with said outlet port of said filter housing.

The inner container may be selectively removable from the outer container, and the filter housing may be seated in the lower end portion of the outer housing. The filter housing may be laterally displaceable relative to the first housing, and a pour spout may be provided for selective flow communication with the outlet port of the filter housing.

The assembly may further comprise first and second ribs provided on an inner wall of the first housing for defining a pour spout section for receiving the pour spout housing, the pour spout housing having a bottom inlet opening and a top outlet opening.

In another embodiment, the first housing comprises a substantially liquid impermeable housing having bottom and side walls, a filter housing receiving section being defined in the first housing, adjacent the raw water reservoir, the filter housing being selectively axially displaceable into and out of the filter housing receiving region. The assembly may further comprise first and second rib elements in the first housing for defining the filter housing receiving region. The inlet port of the filter housing may be defined in a bottom end wall thereof and the outlet defined at an upper end thereof. A check valve may be provided for selectively closing the inlet port of the filter housing, and a spacer component may be provided for spacing the bottom end wall of the filter housing from the bottom wall of the first housing. The spacer may comprise a spring element which urges the filter housing upwardly relative to the bottom wall of the first housing.

The closure structure may comprise a semi-fixed portion and a hinge portion movable between open and closed positions selectively providing access to the raw water inlet opening.

The treatment media may comprise a composite structure of carbon and a polyester substrate carrier in one of sponge and fiber form, compressed to form a treatment zone whereby contaminate molecules suspended in water contained in the treatment zone are within about 1.5 mm of the carbon. The filter housing may occupy about 20% of the volume of the first housing. The treatment media may further comprise a static treatment media, the filter housing holds between about 16 and 24 ounces of water, and the treatment media removes at least about 70 to 90% of chlorine and at least about 90% of lead present in the raw water within about 1 to 5 minutes of filling of the filter housing. Typically, the chlorine and lead are removed within about 1–2 minutes of initial filling.

According to another aspect of the present invention a filtration medium is provided comprising randomly oriented inert fibers in mat form with a bulk density of about 200–600 grams per cubic yard of a nominal $\frac{1}{16}$ to $\frac{1}{2}$ inch thickness, one of bonded and coated with a treatment media comprising at least one of activated carbon, zeolite compounds, ion-exchange resins, iodinated resins, and contaminate specific polymers, the treatment media ranging from about 100 grams per square yard to 300 grams per square yard, and compressed to obtain a certain void size distribution, as discussed in Appendix A.

According to yet another aspect of the present invention a method of purifying the water using a water filtration assembly including a first housing having upper and lower end portions and defining a reservoir for water to be purified, and a filter housing having a treatment media disposed therewithin, an inlet port for receiving water from a lower end portion of the reservoir, and an outlet for purified water. The method comprises: (a) Flowing water to be purified into the reservoir through an opening defined in the upper end portion of the first housing, at least some of the water to be purified flowing from the lower end portion of the reservoir through the inlet port into the filter housing. (b) Maintaining the water to be purified in the filter housing for at least about 30 seconds in contact with the filter media disposed therewithin, to effect removal of contaminants therefrom. And (c) dispensing through the outlet port water that has been purified in and exited the filter housing.

Typically (b) is practiced to fully treat the water to be purified to remove at least about 70% of the chlorine and at least about 90% of the lead in the water to be purified, to produce purified water, in about 1–2 minutes.

The method may further comprise placing the filter housing in the first housing, so that the filter housing is seated adjacent a bottom wall thereof. The method may also further comprise moving the filter housing laterally relative to the first housing and into operative communication with the lower end portion of the raw water reservoir. The method may still further comprise inserting the housing into the filter housing receiving compartment, and/or inserting a pour housing into the first housing and placing the pour housing in flow communication with the outlet port of the filter housing.

The above and other objects, features, and characteristics of the present invention as well as the methods of operation and functions of the related elements of the structure, and the combination of parts and economies of manufacture, will become more apparent upon consideration of the following description and the appended claims.

BRIEF DESCRIPTION OF THE DRAWINGS

FIG. 5 is a schematic illustration of an exemplary pitcher/carafe with independent axial high performance filter according to the invention;

FIG. 6 is a schematic illustration of the replaceable filter unit of the embodiment of FIG. 5;

FIG. 7 is a schematic top plan view of the pitcher/carafe shown in FIG. 5 with the replaceable filter unit omitted for clarity;

DETAILED DESCRIPTION OF THE INVENTION

Figure 1:
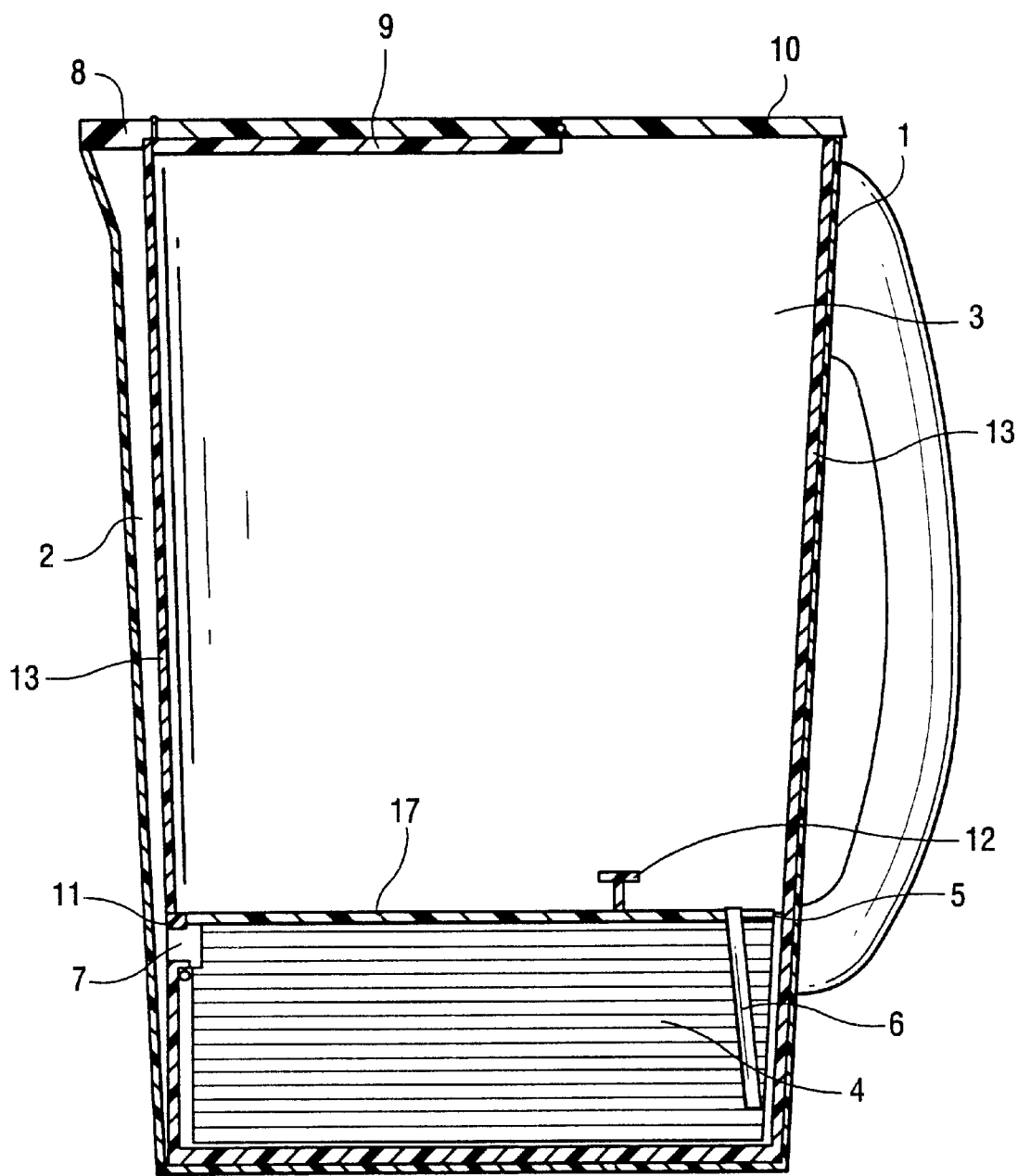
FIG. 1 schematically illustrates an exemplary exit filtration pitcher/carafe according to the invention.

FIG. 1 schematically illustrates an exemplary exit filtration pitcher/carafe according to the invention.

The carafe housing 1 contains the raw water reservoir 3, which is in the inner housing 13, into which the high performance filter 4 is placed. The water enters the filter 4 through the water entry port 5 and in turn travels down the water entry tube 6 to the back and bottom of the filter. In 1–3 minutes the water percolates through the filter element 4, until it reaches the water exit port 7. The water will continue to be treated and flow up into the pouring chamber 2 until the water level equalizes in height in the reservoir 3 and the pouring chamber 2. An edge sealing gasket 11 seals the filter to the pouring chamber eliminating leakage at the exit port. The filter 4 and its housing 14 may be placed into and removed from the inside of the raw water reservoir with the aid of the removal tab 12. The water is retained in the reservoir 3 by the semi-fixed top 9 to which is affixed a hinged fill port 10 and a hinged pour top 8.

Figure 2:
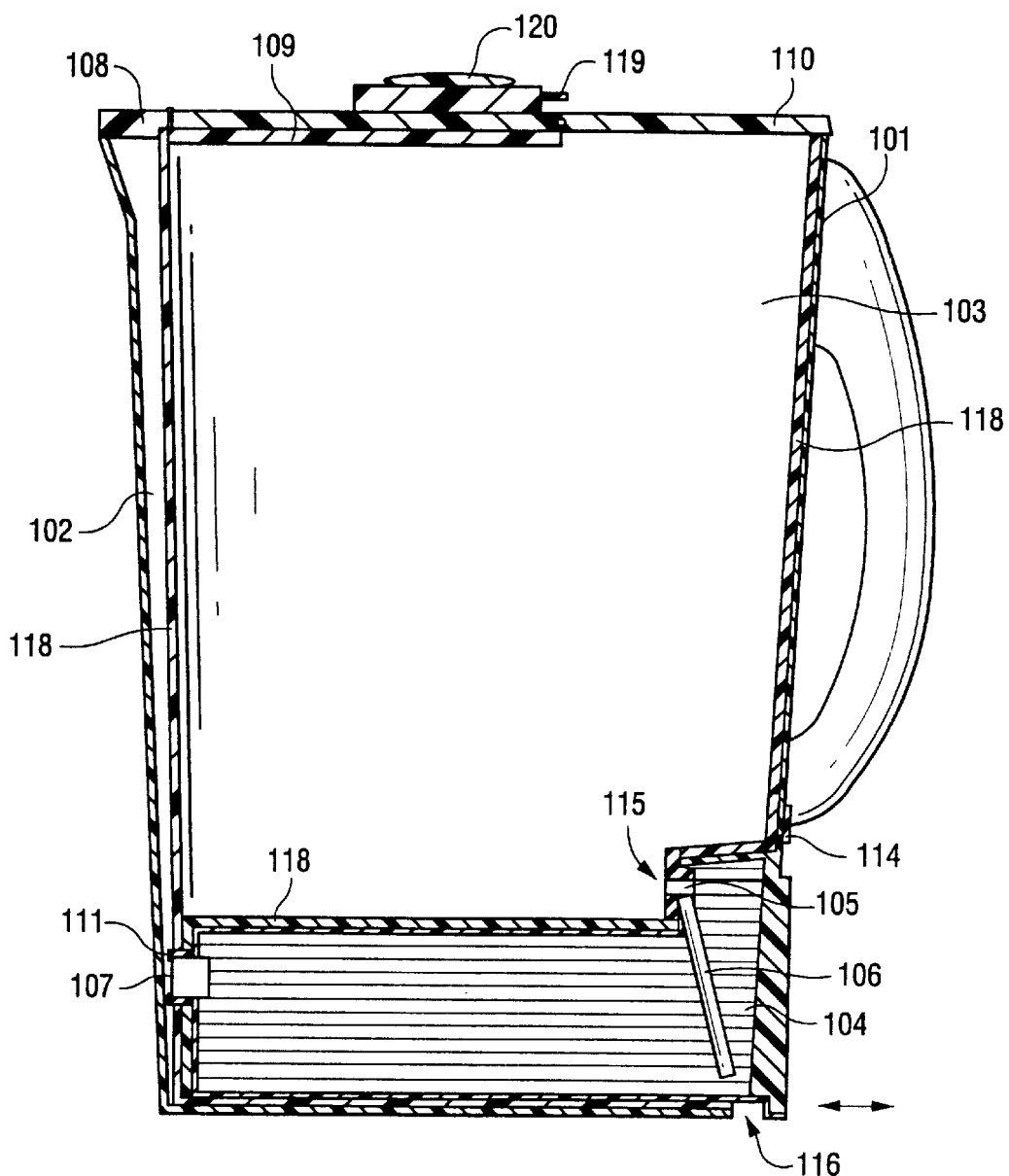
FIG. 2 schematically illustrates an exemplary side loading exit filtration pitcher/carafe according to the invention.
Figure 3:
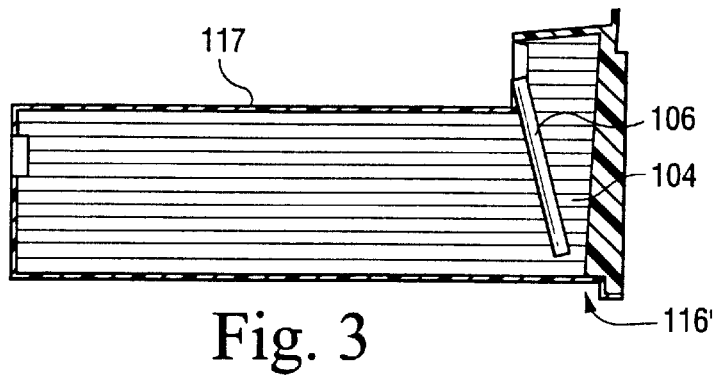
FIG. 3 schematically illustrates the replaceable filter housing of the embodiment of FIG. 2.

FIGS. 2 and 3 schematically illustrate an exemplary embodiment of a filter side loading exit filtration carafe according to the invention. In FIG. 2 elements substantially the same as in the FIG. 1 embodiment are shown by the same reference numerals plus 100.

The carafe housing 101 contains an inner molded shell 118, which forms the interface with the filter element 104 and the exit water pouring chamber 102. The inner shell 118 is permanently bonded to the housing 101. The filter 104 uses a water entry tube 106 to direct the raw water to the back and base of the filter from the water entrance port 105. The exit port from the filter 107 is sealed to the entry port of the water-pouring chamber by the interface seal 111. The leak-proof semi-fixed top 109 mounts a mechanical counter 120, which is automatically indexed by pin 119 each time the hinged fill port 110 is opened. At a preset number of indexes a warning indicator informs the user that it is now time to change the filter. A hinged pour top closure 108 is also attached to the semi-fixed top 109. The filter housing 117 is slid sideways into a receiving receptacle and held in position by the filter release lever 114 which also forces the seal 115 interfacing the filter housing 117 with the inner molded shell, or housing 118. To aid in filter 104 removal a finger access slot 116 is molded into the container 101 base as well as into the filter housing 117 as at 116'.

Figure 4:
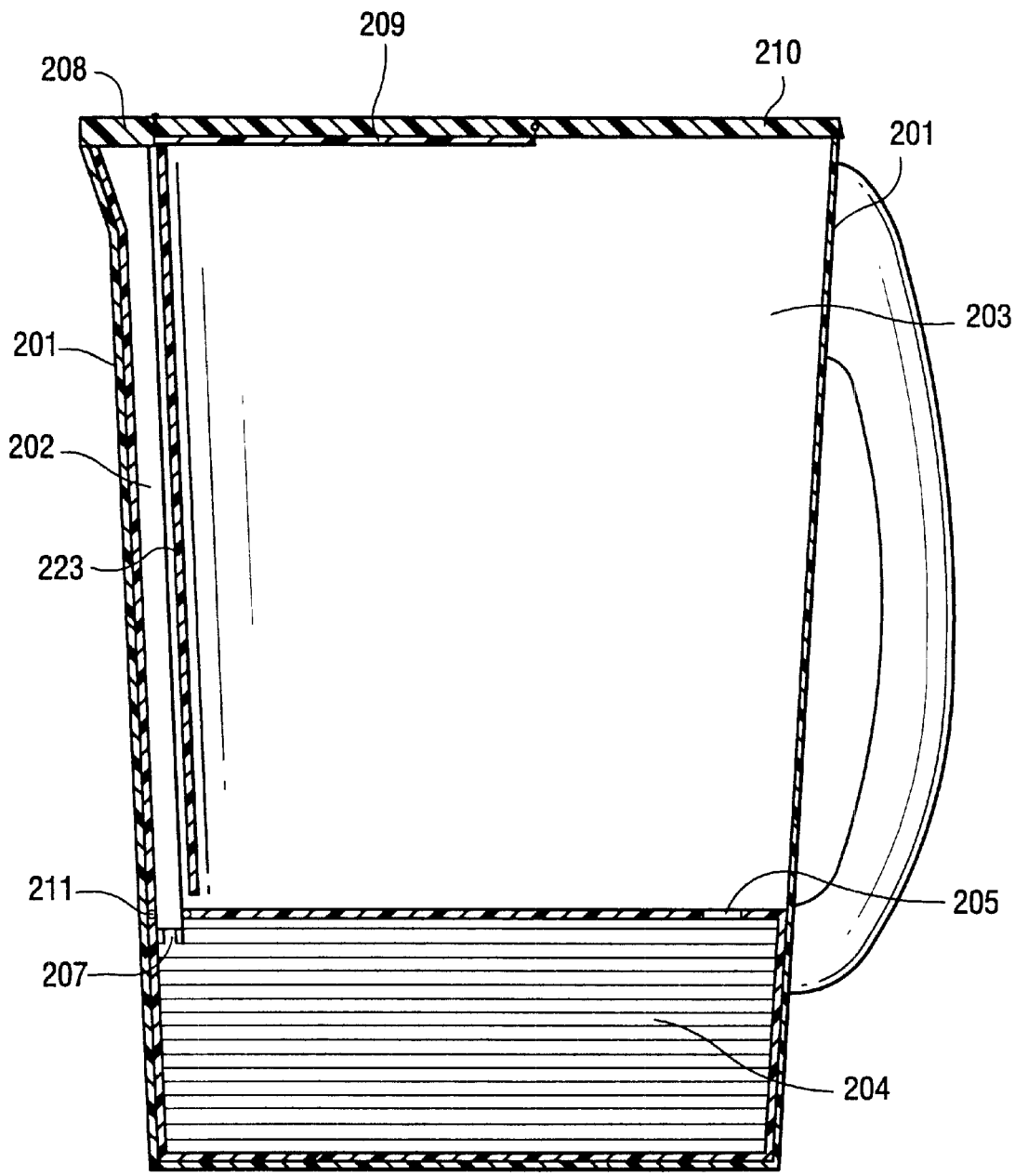
FIG. 4 schematically illustrates an exemplary pitcher/carafe with independent axial pour spout according to the invention.

FIG. 4 schematically illustrates an embodiment of a pitcher with independent pour spout, and inner housing. In this embodiment components comparable to those in FIG. 1 are shown by the same reference numerals plus 200.

The elements of the preceding designs are essentially the same with the exception that the principle component is the carafe housing 201, which defines the raw water reservoir 203. A filter element 204 is placed into the base of the housing 201 and an independent pouring element 202 is inserted into the carafe housing 201 and supported and positioned by ribs or ridges 223, e.g., molded into the carafe's interior. The base of the independent pouring element 202 is inserted into the filter housing exit port 207, and sealed by the elastomeric ring 211. The independent pouring element may be used to assist in the placement and removal of the filter element 204 from the carafe housing 201. The water entry port 205 and the entrance tube are sized to generate a minimum of about two minutes contact with the filter media on the initial fill and pour.

FIGS. 5–7 schematically illustrate an exemplary embodiment of an internal independent axial high performance filter. In this embodiment components comparable to those in FIG. 1 are shown by the same reference numerals plus 300.

A carafe housing 301 forms the raw water reservoir. A separate insertable and replaceable filter element 317, containing static filtration media 304, is inserted from the top into the carafe spout section 302, and positioned by molded guides 323 on the inner walls of the carafe housing 301. As the filtration media 304 extends to the top of the carafe, upon filling of the raw water section of the carafe, water enters and remains within the treatment area, until the water is poured. The water enters the independent filtration/treatment element 304 through the water entry port 305. A ball check valve 324 which seats against seal 325 retains water within the independent filtration/treatment element 304 when the head, or water height, in the raw water reservoir 303 is below the level of treated water within the independent filtration/treatment element 304. This also permits the independent filtration/treatment element 304 to fill at the base, as it is being drained at the top. The spring 326 at the base of the independent filtration/treatment housing 317 maintains the clearance from the base of the pitcher or carafe housing 301 and also maintains pressure of the top 327 of housing 317 against the top of the container 301, forming a seal with the top and from the raw water reservoir. The top of container 301 comprises or consists of three sections; the sealing semi-fixed top 309, the opening fill cover 310, and the pour cover 308.

Figure 8:
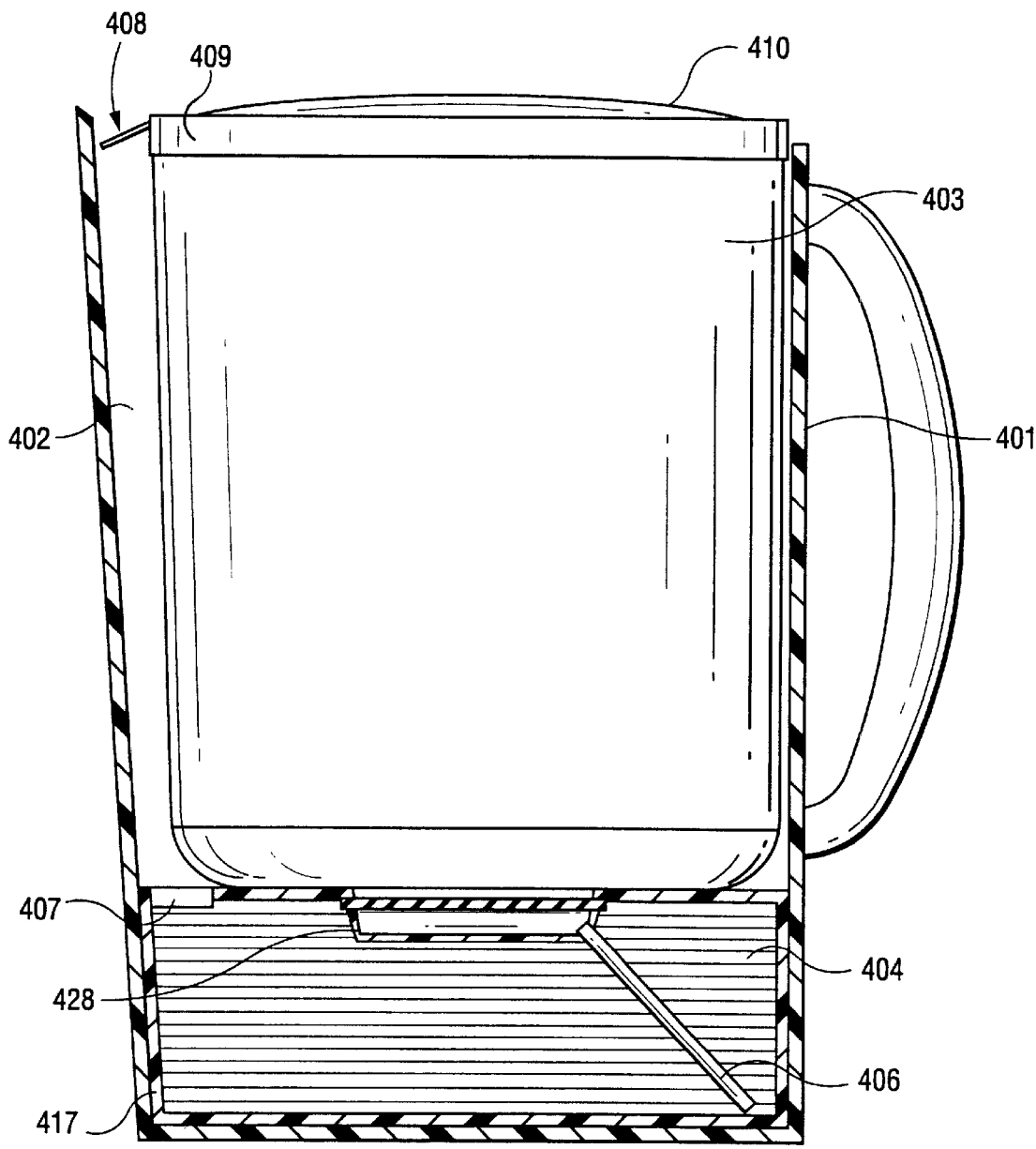
FIG. 8 is a schematic illustration of another embodiment of a high performance static filtration pitcher/carafe of the invention.
Figure 9:
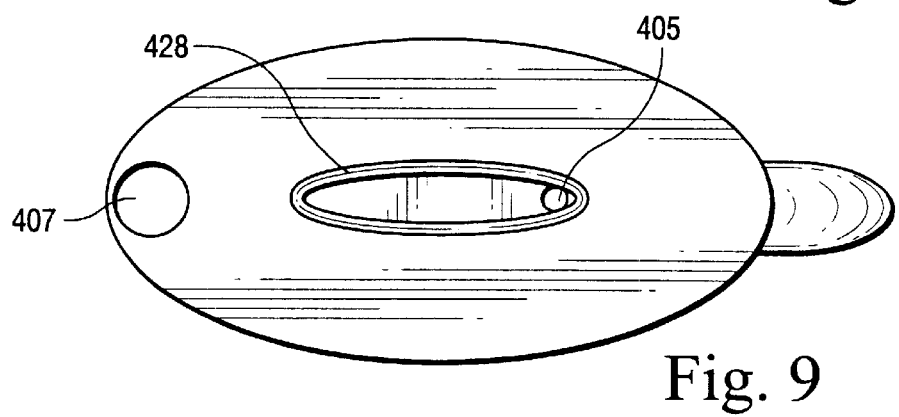
FIG. 9 is a schematic top plan view of the filter housing of the embodiment of FIG. 8.

FIGS. 8 and 9 schematically illustrate another embodiment of a high performance static filtration pitcher in accordance with the invention. In this embodiment components comparable to those in FIG. 1 are shown by the same reference numerals plus 400.

The carafe 401 supports an inner housing which functions as a raw water reservoir 403. An independent static filtration, or treatment, housing 417 snaps and seals to the base of the raw water reservoir 403. Water enters the filtration media 404 through port 405 and the water entry tube 406, which conducts the water to the bottom of the treatment media 404. The tube size/diameter, controls the flow rate into the treatment media to assure the residence time, i.e., the time the water is in contact with the treatment media, meets the product design criteria for contaminant removal. Water exits the treatment media 404 through the treated water exit port 407. The embodiment provides for residence times which may be extended from about one minute to substantially infinity. Upon exiting the exit port the water passes into the pouring chamber 402 of the carafe 401. The raw water reservoir is sealed by the semi-fixed top 409, which supports a removable lid 410 for filling. A gasket seal 428 precludes raw water from escaping prior to entering the treatment media 404.

Important aspects of the structures or procedures according to the invention include:

The use of a media, activated carbon or other water treatment composition (e.g. 4, 104, etc.), which is bound to a substrate of sufficient strength to resist compacting under the pressure of water exerted by gravity. The coated substrate is designed to be compressible to control void volume typically from 0.0001 mL–1.5 mL. Suitable substrates may include but are not limited to non-woven fabrics, woven fabrics, impregnated open cell foams, and/or felts. The water treatment media is bound to the substrate by an acrylic or other flexible binder eluting no detectable toxic substances.

A filtration element comprises or consists of randomly oriented inert fibers in mat form with a bulk density of about 200–600 grams per cubic yard of a nominal 1/16–1/2 inch thickness, bonded or coated with any one or more conventional water treatment media including activated carbon, zeolite compounds, ion-exchange resins, iodinated resins, and contaminant specific polymers; the coatings typically ranging from about 100 grams per sq. yard to 300 grams per sq. yard of activated carbon or other treatment media.

Static treatment by which a high level of contaminant removal can be effected in an adsorptive/reactive device which produces a useful output volume, without requiring bulk flow of fluid through a bed of media, other than at the time of entry and removal of the fluid from the device. Static treatment involves maintaining fluid to be treated within a diverse matrix of adsorptive and/or reactive media, so that migration to the active sites is accomplished through diffusion rather than convective flow. A treatment media which is manufactured/manipulated to possess diffusivities (at least of common water contaminants) are such that the RDV/BV ratio (readily deliverable fluid/bed volume) is from about 0.3 to 0.6, preferably at least about 0.4. The time frame for treatment may vary from seconds to minutes even in the absence of convective flow in order to allow for the production of a useful output volume of fluid per batch treated, when operated using the technique of static treatment and/or filtration.

A method by which media as disclosed above statically treats of fluids under conditions of optimal residence time by affixing activated carbon, or other treatment media, to randomly oriented fibers, or other highly porous and compressible substrates. The carbon fiber (or other media) matrix is then compressed to form a treatment zone in which the contaminant molecules contained in the fluid within the treatment zone are within 1.5 millimeters, or less, of a carbon, or other media, element. This provides for the movement of contaminant molecules to an active site on the media within a predicable period of time, without requiring convective flow. Diffusivities of common water contaminants are on the order of $5 \times 10^{-6}$ cm$^2$/s, allowing treatment of the water within a time span of seconds to minutes even without water flowing through the filter. Diffusion and equilibrium within a body of fluid are the phenomena which form the basics of the mechanism by which static treatment functions. The time element for contact is generally from 30 seconds to 10 minutes depending upon the contamination and removal percentage required.

A media as described above can be employed in static treatment as an adsorptive device, a reactive device, or both. Utility is not restricted to applications involving purely physicochemical mechanisms of removal, but may also be employed as a bioreactor. Microbes may be induced or encouraged to reside on the surfaces of the medium, and provide for additional contaminant removal.

A device according to the invention may employ static treatment, either alone or in conjunction with traditional flow through adsorptive methods, for the purification of liquids.

A media according to the invention may be produced by the coating of non-woven fibers with an adsorptive/reactive material, such as described in Appendix A for the purpose of removing contaminants from water for the purpose of potability.

A media composed either of a composite structure of media, such as carbon, combined with a substrate carrier of polyester or other coatable material affixed by a binder, appropriate to the end use application. Other adhering methods may include ionic bonding, vapor deposition, and chemical bonding as well as the mechanical "adhesive" bonding referred to.

A media composed either of a composite structure of media such as carbon combined with a substrate carrier of polyester or other coatable material in sponge or fiber form which may be compressed or expanded to achieve an idealized porosity for the storage of water being treated permitting contact with the active surfaces of at least about 70–90% of the contaminant within a period of about 1–5 minutes. Typically, the individual void, or treatment zone, is within 1.5 mm, or less, of a physical treatment site.

A media composed either of a composite structure such as carbon and/or ion exchange resins or polymers combined with a substrate carrier of polyester or other coatable material meeting the FDA requirements for a water treatment material which can be in constant contact with the water.

An independent replaceable static treatment element normally comprising approximately 20% of the entire container volume, but may extend within the range of 10–90% or more.

An independent replaceable static treatment element (e.g. affixed to, at, or adjacent the base of the raw water reservoir) with controlled access for the entry of water at the top rear of the filter housing, placed to preclude the return of any significant quantity of water back into the raw water reservoir.

An independent replaceable static treatment element with controlled access for the entry of water at the top rear of the filter housing with a rapid pour or discharge port at the forward end of the filter housing. Such a discharge port may be sized to permit a rapid continuous stream of water to the capacity of the filter.

An independent replaceable static treatment element with rapid access for the entry of water at the base of the filter housing placed at the top or side of the raw water reservoir, typically with a check valve to retain the water to be treated within the filter housing to maximize contaminant removal when the container is in the upright position. A rapid discharge port may be incorporated in the top of the filter housing.

An independent replaceable static treatment element with controlled access for the entry of water at the top rear of the filter housing placed into the base of the raw water reservoir, which in turn has seals to permit only treated water to enter the external pour compartment.

An independent replaceable static treatment element with controlled access for the entry of water at the top rear of the filter housing placed below the base of the raw water reservoir, which in turn has seals to permit only untreated water to enter the filter housing which in turn independently seals to the water discharge channel. The filter may be side or bottom loaded into the container housing and mechanically retained in place.

A water pitcher or carafe which treats/filters the total volume, when filled with water.

An independent replaceable static treatment element contained within it's own housing totally filled with the static treatment media which acts as a reservoir of treated water and, while not limited thereto, typically holds two-three eight ounce glasses.

An independent replaceable static treatment element contained within it's own housing totally filled with the static treatment media which acts as a reservoir for treating and storing treated water delivering water with about =70–90% of chlorine removed and about =90% of the lead removed from the raw water within about 1–2 minutes after the initial treatment volume.

An independent replaceable static treatment element contained within it's own housing substantially totally filled with the static treatment media which acts as a reservoir of treated water and while not limited, typically holds two-three eight ounce glasses and removes about =70–90% of chlorine and about =90% of the lead present in the raw water within about 2–5 minutes for the initial treatment volume.

An independent replaceable static treatment element contained within it's own housing substantially totally filled with the static treatment media which acts as a reservoir of treated water and is designed to treat a minimum of about 25–100 gallons removing about =70–90% of chlorine and about =90% of the lead present in the raw water.

A filtration media designed to act in the static mode retaining the water within the filter bed maximizing contaminant removal which is not size or configuration limited, adaptable to anything from a sport type bottle to an industrial size tank.

A carafe or pitcher configured to separate treated from non treated water, separated by a baffle or other separator, substantially the only communication between the treated and untreated water being through the treatment element.

A carafe or pitcher configured to separate treated from non treated water, separated by a baffle or other separator, substantially the only communication between the treated and untreated water being through the filter in a non continuous flow mode. Head pressure does not affect the efficiency of the filter subsequent to the first pour used to activate and purge the filter of carbon or other fines.

A static treatment element as described above contained within a housing which may contain two or more independent and differing media of similar or differing substrates permitting compression or expansion to achieve the desired area of active media and to control the size of the water positioning voids to assure that the contaminant laden water is within the transfer range of media within the designed time period.

A static treatment element as described above contained within a housing which may incorporate an outer or exit component of 1–4 micron porosity functioning as a biological barrier filter for the removal of cysts such as Giardia and Cryptosporidium.

A static treatment element as described above contained within a housing which may incorporate an outer initial filtration element consisting of non-organic micro-fibers formatted to achieve a 1–4 micron porosity to function as a biological barrier filter for the removal of cysts such as Giardia and Cryptosporidium. The micro-fiber filter element preferable is pleated to maximize surface area; however, the micro-fiber filter element may alternatively be utilized in sheet form.

A static treatment element as described above, the flow of water into which is restricted by inlet orifice size or other means to typically provide about 2–3 minutes of contact time within the treatment bed prior to the water exiting the treatment element.

A static treatment element as described above, where the water is released into the treatment element at the base and rear of the treatment element housing and exits at the forward top of the treatment element housing assuring maximum contact of the water, or other fluid being treated, with the treatment media.

A filtration or treatment element which controls the minimum time in contact with the media by using head pressure combined with the orifice size of the water inlet to the treatment element; and also may deliver the water for treatment to the farthest practical point from the water discharge port in the filter or treatment element body.

A preferred embodiment of the filtration media used in the practice of the invention primarily comprises a non-woven mat of polyester having a weight of about 4–7 oz. per square yard and which is impregnated with a water treatment media such as carbon, zeolite, etc. as described below, and is subject to compression at an appropriate time (either during manufacture with the coating, or at some earlier or later time), the amount of compression typically being between about 25–75%, more desirably between about 40–60%, e.g. about 50%. The compression is such so as to make an optimal narrow void size distribution in the mat. For example, procedures and equipment such as shown in U.S. Pat. Nos. 3,019,127, 4,793,837, 4,963,431, or 5,161,686 (the disclosures of which are hereby incorporated by reference herein) may be utilized. Also constructions such as shown in Japanese patent publication 58146421 may be employed. While a polyester non-woven is preferred as the base material, virtually any synthetic or natural fibers that are not toxic and are capable of being formed into a porous non-woven, having the attributes set forth below, may be utilized. Also, if the appropriate material is used, a woven or knit construction, or the like, also may be employed for the base material.

The preferred method of manufacture of coated non-wovens such as those used which can be used in static filtration, are to draw rolls of non-woven fabric through a dipping bath where the materials the fabric is to be coated with are suspended. The bath preferably contains water treatment media such as activated carbon, ceramic cation-exchangers such as zeolites or amorphous gels such as sodium aluminosilicate or sodium titanium silicate, as well as a binder to secure them to the non-woven. The fabric is generally pulled through the bath where the fabric becomes saturated with coating material, and then through a series of rollers which squeeze excess coating from the fabric for return to the dipping bath. As the coated fabric exits the rollers it is then pulled through a drying oven where the binder is allowed to cure. Tension is usually maintained at the leading and trailing ends of the fabric to ensure that the fabric moves through the process in a uniform manner, and other agents may be added to the coated fabric prior to drying in order to facilitate curing of the binder. Important to the application of static filtration, the rollers described above serve not only to squeeze excess coating from the fabric, but also perform the aforementioned compression induced collapse of the largest void spaces to yield a product with vastly improved performance.

To illustrate this point, consider two hypothetical media extremes, one with a large percentage of very small void spaces and one which predominates in large voids. Both media types fall within the description of the media in EP 0402661. In the first case the fluid would be held in close proximity to the sites of adsorption or reaction, facilitating rapid removal of contaminants from the water. The small volume voids would however experience capillary forces which would hold the water more tightly than in the larger voids, restricting the application to taller filters where a sizable column of water may be needed to supply the gravitational force needed to overcome this wicking action when the device is poured. In filters with a predominance of smaller voids, the capacity of the device to deliver water is reduced, even if the void volume is large. Conversely, in media with a preponderance of larger voids deliverable capacity is great and fill and pour rates are high, but the kinetics of removal are slow.

To achieve static treatment activated carbon, as well as other media, are affixed to randomly oriented fibers, or other highly porous substrates. In this invention the porous substrate is restricted to materials which are non-rigid, and subject to post impregnation compression. The starting materials are selected to provide a treatment media with a distribution of void volumes which is shifted toward the large side of the desired mean value of about 65 nL (nanoliters). The resulting matrix is compressed to preferentially collapse the larger void spaces to sizes which are closer to the desired mean, forming a narrower distribution of void sizes. The resultant treatment zones whereby the contaminant molecules contained within the zones are without about one millimeter, or less of a carbon, or other media element. Such a configuration provides for the movement of contaminant molecules to an active site on the media within a practical amount of time, without requiring convective flow. Diffusivities of common water contaminants are on the order of $5 * 10^{-6}$ cm$^2$/5, allowing treatment of the water within a time span of seconds to minutes, even without water flowing through the filter.

The effect of compression on results may be seen from the following tables:

TABLE 1

The theoretical effects of compression on performance.

| | Percent Contaminant Removal | |
|---|---|---|
| Time (min) | Uncompressed | Compressed |
| 0.0 | 30.63 | 32.86 |
| 0.5 | 70.16 | 75.97 |
| 1.0 | 78.68 | 85.26 |
| 1.5 | 83.44 | 90.08 |
| 2.0 | 86.53 | 92.93 |
| 2.5 | 88.70 | 94.75 |
| 3.0 | 90.33 | 95.98 |

TABLE 2

The effects of compression on performance.

| | Contaminant Concentration ($\mu$g/mLI) | |
|---|---|---|
| Compression Level (%) | Influent | Effluent |
| 12 | 185 | 30 |
| 37 | 185 | 25 |
| 51 | 185 | 8 |

The size and distribution of void spaces within the filter media has a marked affect on the performance of the filter with respect to contaminant removal. If one assumes a Weibull distribution of void sizes with parameter 'a' of 20 and a parameter 'b' of 1.05, the kinetics of removal are shown in Table 1. Table 1 lists the percentage removal for the theoretical system at several time intervals. If the treatment objective is to reach 90% removal of a particular contaminant (as is required for certification by the NSF[2] for lead removal) improvement as a result of compression may be dramatic in terms of ease of use of the filter. In this example the uncompressed media takes twice as long to reach compliance.

Laboratory analysis of media performance under various levels f compression were performed to validate the theoretical model, with these results presented in Table 2. A controlled volume vessel was packed with media compressed from 100% to around 50% of its original thickness. Media which was midway through its useful life was used for testing at exposure times of three minutes, on order to yield effluent concentrations which were detectable by anodic stripping voltametry. The performance of the media for lead removal was shown to increase dramatically with compression, moving from a low tested value of 84% removal at 12% compression to a maximum tested value of 96% at about 50% compression.

The composition of a medium which possess optimum characteristics for providing a narrow void size distribution in the appropriate size-range with compression, is as follows. The numbers refer to a sheet of one square yard of coated material (polyester non-woven fabric 4 to 7 ounces/sq. yd), which is compressed to a thickness of approximately 8 mm. This media has been compressed in the planar dimension by approximately 50% as compared to uncompressed coated media.

Functional Coating equal to about 100 to 200% of the uncoated fabric weight, comprised of
Acrylic binder about 10 to 20% of the coating by weight
Coconut shell activated carbon about 60 to 85% of the coating by weight
Zeolite molecular sieve about 5 to 20% of the coating by weight The preferred substrate for the fabric is polyester, due to its wetability and stability. Since the filters are designed for use in treating potable water, a substrate which is listed under Title 21 of the Code of Federal Regulations, Section 177.2260 (21CFR177.2260) is appropriate. The adsorbent material used to coat the substrate is typically ground to a powder in order to facilitate the coating process and improve the kinetics of adsorption, but static treatment media can be produced using particles of essentially any size so long as the RDV/BV requirements are not violated. The polyester base is formed into a non-woven fabric prior to coating using the same FDA compliant binder which is used to coat the fabric. The concentration of binder is critical to the stability of the media.

Orientation of the media so that the plane of compression on fabrication is parallel to the flow path is important in the successful fabrication of a filter. In EP 402661 a spiral orientation is provided which fits this criteria, however it has been discovered that treatment efficiency and volume of production are greatly reduced if the plane of compression is perpendicular to the flow path. In the dip-coating process described above, non-woven is pulled through a coating tank, squeezed through rollers, and pulled through a drying oven. This process creates a product which has different surface characteristics on the two flat faces, and this alteration tends to cause water in the matrix to be retained when the faces are not oriented parallel to the flow path (for pouring and filing). The effect is that the rolling process creates a preponderance of small void regions near the surfaces of the felt which contact the rollers. If the filter media is oriented such that the plane surfaces are oriented perpendicular to the direction water flows during filling and pouring, the relatively compressed faces of the non-woven sheets inhibit initial wetting and fluid drainage from the filter. This decrease in drainage increases the percentage of less highly treated fluid which exits during a pouring step, as fluid held in regions more distal to the adsorption sites (which may undergo less treatment), would also preferentially drain from the filter.

The invention also specifically encompasses all narrower ranges within the broad ranges set forth above, e.g., RDV/BV ratios of 0.35–0.55, 0.4–0.58, and all other ranges between 0.3–0.6.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of purifying water using a water filtration assembly including a first housing having upper and lower end portions and defining a reservoir for water to be purified, and a filter housing having a treatment media with active sites disposed therewithin, an inlet port for receiving water from a lower end portion of the reservoir, and an outlet port for purified water, said method comprising:

(a) flowing water to be purified into the reservoir through an opening defined in the upper end portion of the first housing, at least some of the water to be purified flowing from the lower end portion of the reservoir through the inlet port into the filter housing, the inlet port guiding the water to be purified to a back and bottom of the treatment media;

(b) maintaining the water to be purified in the filter housing for at least about 30 seconds in contact with the treatment media disposed therewithin, to effect removal of contaminants therefrom, wherein the treatment media comprises a static treatment media bound to a substrate such that migration to the active sites is accomplished through diffusion; and (c) dispensing through the outlet port water that has been purified in and exited the filter housing.

2. A method of purifying water as in claim 1, further comprising placing the filter housing in the first housing, so that the filter housing is seated adjacent a bottom wall thereof.

3. A method of purifying water as in claim 1, wherein the filter housing is laterally displaceable relative to the first housing, into and out of communication with the reservoir, and further comprising moving the filter housing laterally relative to the first housing and into operative communication with the lower end portion of the reservoir.

4. A method of purifying water as in claim 1, wherein the first housing defines a filter housing receiving region, and wherein the filter housing is axially displaceable into and out of the filter housing receiving region for being selectively placed in operative communication with the reservoir, and further comprising the step of inserting the filter housing into the filter housing receiving region.

5. A method of purifying water as in claim 1, wherein the filtration assembly further comprises a pour housing, and further comprising inserting the pour housing into the first housing and placing the pour housing in flow communication with the outlet port of the filter housing.

6. A method of purifying water as in claim 1, wherein (b) comprises maintaining the water to be purified in the filter housing for a sufficient time to fully treat the water to be purified to remove at least about 70% of chlorine and at least about 90% of lead in the water to be purified, to produce purified water, in about 1–2 minutes.

7. A method of purifying water using a water filtration assembly including a first housing having upper and lower end portions and defining a reservoir for water to be purified, and a filter housing having a static treatment media with active sites disposed therewithin, which static treatment media is bound to a substrate, an inlet port for receiving water from a lower end portion of the reservoir, and an outlet port for purified water, said method comprising:

(a) flowing water to be purified into the reservoir through an opening defined in the upper end portion of the first housing, at least some of the water to be purified flowing from the lower end portion of the reservoir through the inlet port into the filter housing, the inlet port guiding the water to be purified to a back and bottom of the treatment media;

(b) accumulating a volume of water in the filter housing and maintaining the volume of water in contact with the static treatment media for a sufficient time to effect treatment via migration to the active sites through diffusion; and (c) dispensing through the outlet port water that has been purified in and exited the filter housing.

* * * * *